Jan. 28, 1930.  E. T. PARSONS  1,745,228
DOUGH MOLDING MACHINE
Filed May 31, 1928   2 Sheets-Sheet 1
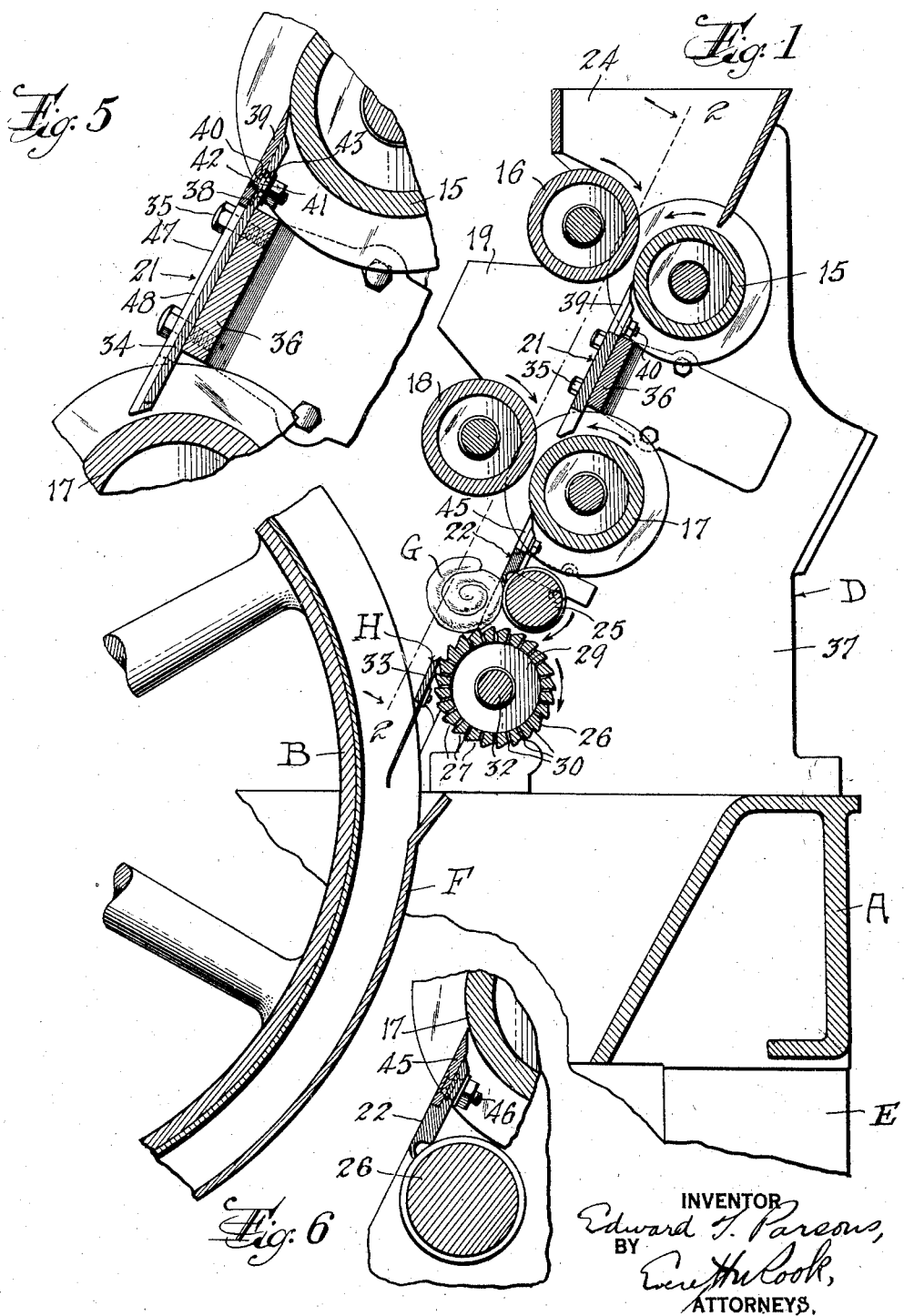
INVENTOR
Edward T. Parsons,
BY
Everett H. Cook,
ATTORNEYS.

Jan. 28, 1930.  E. T. PARSONS  1,745,228
DOUGH MOLDING MACHINE
Filed May 31, 1928  2 Sheets-Sheet 2
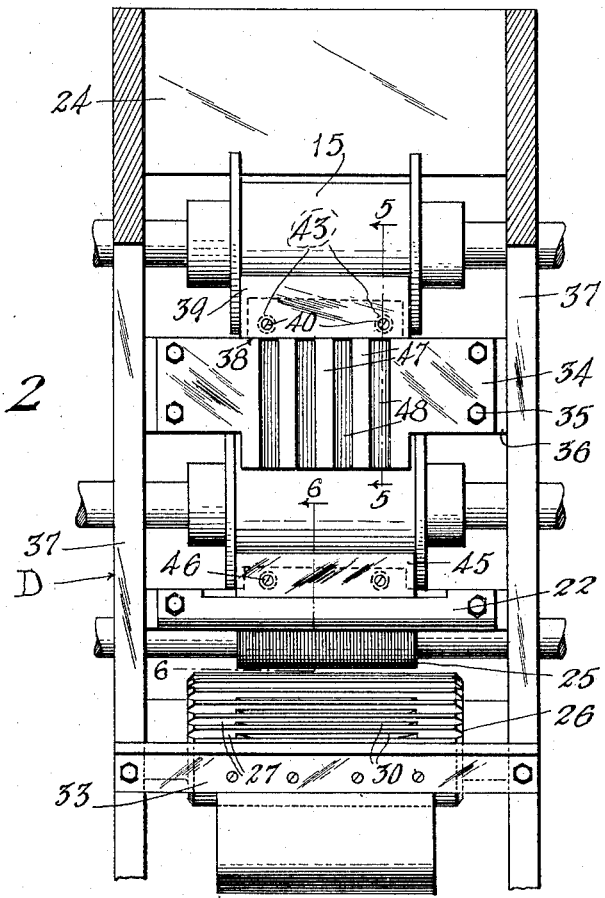
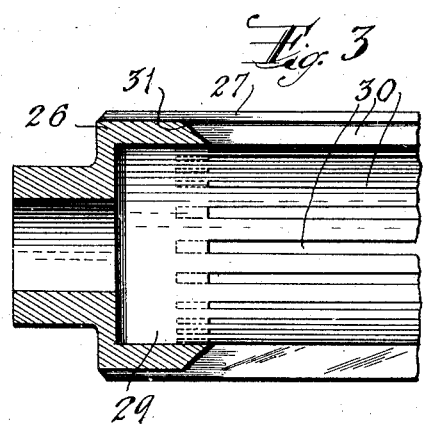
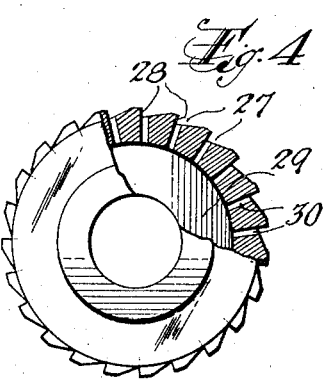
INVENTOR
Edward T. Parsons,
BY
ATTORNEY Patented Jan. 28, 1930

1,745,228

UNITED STATES PATENT OFFICE

EDWARD T. PARSONS, OF UPPER MONTCLAIR, NEW JERSEY, ASSIGNOR TO THOMSON MACHINE COMPANY, A CORPORATION OF NEW JERSEY

DOUGH-MOLDING MACHINE

Application filed May 31, 1928. Serial No. 281,729.

This invention relates in general to a dough molding machine of the type described in United States Patent No. 701,646, to C. A. Thomson, June 3, 1902, in which a ball or lump of dough is first rolled between driven rollers into a thin sheet which is subsequently automatically spirally rolled to form a substantially cylindrical loaf, said loaf being then subjected to a rolling and squeezing pressure between a rotating drum and a semi-circular compression plate to knead or work the dough into proper condition for the pan. Such machines usually include a loaf forming mechanism which comprises a smooth roller arranged beneath the lower part of the dough sheeting mechanism, and a fluted roller arranged beneath the smooth roller and adjacent the drum, the fluted roller and the smooth roller cooperating to form the sheet of dough into a spiral roll which is deposited between the rotating drum and the compression plate.

Gluten and flour adhere to the fluted roller and in time fill up the grooves or flutes so as to produce a smooth surface which impairs or destroys the curling function of said fluted roller.

Guide plates are provided to bridge the spaces between said driven rollers and between the last driven roller and said fluted roller to guide the sheet of dough, and scrapers are formed on said guide plates to remove the gluten and flour which adhere to said driven rollers during the sheeting operation.

Among the objects of my invention is to so form the fluted roller that the loose flour or dust and the gluten cannot adhere thereto, and to construct said roller with an interior chamber and slots which open therefrom outwardly through the periphery of said roller in the bottoms of the grooves or flutes, whereby loose flour or dust may fall into said chamber and again be thrown outwardly through said slots by centrifugal force set up by revolution of the fluted roller, over the surface thereof, upon adjacent parts, and upon the dough to prevent gluten from adhering to the roller and said adjacent parts.

Other objects are to provide adjustable and removable scraping blades on said guide plates to scrape the gluten from said driven sheeting rollers, whereby the scraping edges may be accurately adjusted with respect to the surfaces of the corresponding rollers and without disturbing the proper bridging relation of the guide plates and the adjacent rollers, and said scraping blades may be renewed when worn out; to provide a novel and improved means for adjustably mounting said scraping blades; to provide a novel and improved construction of guide plate having a minimum of surface to which gluten can adhere and to reduce the impedance by friction to travel of dough thereover and to obtain other advantages and results as will be brought out by the following description.

Referring to the accompanying drawings, in which corresponding and like parts are designated by the same reference characters throughout the several views, Figure 1 is a vertical longitudinal sectional view through the dough sheeting and loaf forming mechanism of a dough molding machine, showing my new fluted roller and adjustable scraping blades.

Figure 2 is a transverse vertical sectional view taken on the line 2—2 of Figure 1.

Figure 3 is a fragmentary vertical longitudinal sectional view of the fluted roller, Figure 4 is an end elevation thereof partially in transverse vertical section, Figure 5 is a transverse sectional view of one guide plate and scraping blade on the line 5—5 of Figure 2, and Figure 6 is a similar view of the other guide plate and scraper on the line 6—6 of Figure 2.

Referring particularly to Figures 1 and 2 of the drawings, the reference character A designates the main frame of the machine on one end of which is journaled a kneading drum B, one side of said drum being positioned adjacent a dough sheeting and loaf forming mechanism D mounted at the end of the frame opposite the drum. The main frame A is supported by legs or standards E, and the frame of the dough sheeting and loaf forming mechanism D is superposed upon the main frame.

The said dough sheeting and loaf forming mechanism includes two pairs of sheeting rollers 15, 16 and 17, 18 longitudinally spaced on the frame of the mechanism D. One of the rollers of each of said pairs, in the present instance the rollers 16 and 18 are adjustable toward and away from the corresponding rollers 15 and 17 by means of suitable known adjusting mechanism including a slide 19 carrying the rollers 16 and 18 and slidably mounted in guideways at opposite sides of the machine. A hopper 24 is arranged above the uppermost sheeting rollers 15, 16 to receive a lump or ball of dough and guide the same between the sheeting rollers. All of said rollers 15, 16, and 17, 18, are intergeared and driven together from a motor by any suitable means in the directions indicated by the arrows so as to force the dough between the rollers of each pair. The dough passing between the said rollers is formed into a sheet and then is operated upon by a curling and loaf forming mechanism which spirally rolls the sheet into a substantially cylindrical loaf. A guide plate 21 is mounted on the frame to bridge the space between the rollers 16 and 17 and guide the sheet from one pair of rollers to the other pair, and a similar plate 22 is arranged between the lowermost sheeting roller 17 and the threaded roller 25 of the loaf forming mechanism about to be described.

This loaf forming mechanism includes a screw-threaded roller 25 arranged beneath the lower part of the sheeting rollers 17, 18, and a fluted roller 26 arranged beneath the threaded roller 25 and adjacent the drum B. The rollers 25 and 26 of the loaf forming mechanism and the drum B, are driven in the direction indicated by the arrows through suitable gearing not shown.

A compression plate F of sheet metal surrounds the lower half of the kneading drum B in spaced relation thereto to form a channel between said drum and the compression plate. The loaf G formed by the curling roller 26 is deposited by action of gravity over an apron H into the said channel and rolled with a squeezing pressure between the drum and the compression plate to the opposite side of the drum whereby the loaf is properly kneaded and worked into a condition for baking.

My invention relates in part to the fluted roller 26 which is formed on its periphery with a plurality of longitudinal flutes or grooves 27 which provide shoulders or abutments 28 to engage the lower end of the sheet of dough and curl it upwardly against the threaded roller 25. This fluted roller is provided with an interior chamber 29 which may be produced by casting the roller in a hollow formation as clearly shown in Figures 1, 3 and 4; and a plurality of openings in the form of longitudinal slots 30 lead outwardly from said chamber 29 through the outer periphery of the roller at the bases of the flutes or grooves 27. These slots may be formed in any suitable manner as by an arcuate cutter and preferably terminate short of the ends of the roller as indicated at 31. The roller is mounted in the frame of the machine on a shaft 32 which passes longitudinally through the roller as shown in Figure 1.

As above described, this fluted roller is constantly rotated during operation of the machine in the direction of the arrow on Figure 1, and flour dust which may become detached from the sheet of dough as it contacts with the fluted roller may pass through the slots 30 into the chamber 29. The centrifugal action incident to rotation of the roller throws the flour dust outwardly through the slots over the periphery of the fluted roller and also over the adjacent parts such as the periphery of the threaded roller 25 and the curler apron H which directs the loaf G of dough into the space between the kneading drum B and the compression plate F. It is therefore practically impossible for particles of gluten to build up or collect in the bases of the flutes 27, and the flour dust minimizes the tendency of the gluten to adhere to the rollers and apron H. It is therefore possible for the fluted roller to be operated for long periods of time without removal for cleaning the periphery thereof.

Another feature of my invention consists in the detailed construction of the guide plates 21 and 22. The guide plate 21 consists of a main plate 34 which is mounted by bolts 35 upon brackets 36 secured to and projecting inwardly from the side-pieces 37 of the frame of the dough sheeting and loaf forming mechanism. The plate 34 is formed at the edge thereof adjacent the sheeting roller 15 with a rabbet 38 in which is seated a scraping blade 39 arranged to lightly contact with the surface of the sheeting roller 15. This blade is adjustably mounted on the main plate 34 so that its scraping edge may be accurately adjusted with respect to the surface of said roller 15, and its surface is flush with the surface of the guide plate. Any suitable means may be utilized for so mounting the blade, but preferably the blade has attached thereto clamping bolts 40 which are secured to the blade by shoulders 41 and upset heads 42 on the bolts at opposite sides of the blade. The rabbeted portion of the main plate 34 has a pair of openings 43 somewhat larger in diameter than the bolts 40 to loosely receive said bolts, and the bolts have nuts 44 for engaging the side of the main plate 34 opposite that on which the blade is mounted to clamp the blade to the plate. Obviously by loosening the nuts 44 and sliding the blade 39 on the main plate 34, said blade may be adjusted as desired with relation to the sheeting roller 15. This construction also admits of the blade being removed for replacement or repair, and avoids disturbance of the bridging relation of the guide plate to the rollers.

The guide plate 22 is similar in construction to the plate 21, being provided with a scraping blade 45 adjustably secured to the guide plate by bolts 46 just as is the blade 39 on the main plate 34. This construction allows adjustment of the scraping blade 45 with respect to the periphery of the sheeting roller 17.

To minimize the collection of gluten on the guide plates, especially the larger plate 21, the guide surface of the plate may be formed with a plurality of alternate surfaces 47 in the same plane, and spaces 48. A simple construction consists in making the spaces 48 in the form of grooves below the plane of the surfaces 47, and the surface actually shown in the drawings consists of a plurality of alternately arranged ribs and grooves. Obviously the surfaces or ribs 47 form the only bearing or support for the sheet of dough as it passes from the rollers 15 and 16, and therefore only a small amount of gluten will form on the guide surface of the plate. The surfaces 47 being of such small area there will be a minimum tendency for the gluten to collect, and such gluten as does adhere to said surfaces may be easily dislodged, in most instances by the contact of subsequent sheets of dough therewith.

It will be understood that the specific details of construction hereinbefore described are primarily for the purpose of illustrating the principles of my invention, and many modifications and changes may be made in the construction of the apparatus, without departing from the spirit or scope of the invention.

Having thus described my invention, what I claim is:

1. In a dough molding machine, the combination of two pairs of rollers to receive a lump of dough between them and form it into a sheet, a guide plate for guiding said sheet from one pair of rollers to the other and having a rabbet at one edge adjacent the first-mentioned pair of rollers, a scraping blade for scraping the gluten from the surface of one of said first-mentioned pair of rollers mounted in said rabbet to slide toward and from said roller, said blade having its surface flush with the surface of said guide plate, and means for securing said scraping blade on said guide plate in adjusted position relative to the surface of said roller.

2. In a dough molding machine, the combination of a roller and another fluted roller rotating in the same direction to form a sheet of dough into a spiral roll, said fluted roller having an interior chamber, and a plurality of openings leading from said chamber outwardly through the periphery of the fluted roller.

3. In a dough molding machine, the combination of a roller and another fluted roller rotating in the same direction to form a sheet of dough into a spiral roll, said fluted roller having an interior chamber, and a plurality of longitudinal slots leading from said chamber outwardly through the periphery of said fluted roller at the bottoms of the flutes therein.

EDWARD T. PARSONS.